United States Patent [19]

Hessbrüggen

[11] Patent Number: 4,476,752
[45] Date of Patent: Oct. 16, 1984

[54] MACHINE TOOL WITH A SEPARABLE TRANSMISSION FOR ITS WORK SPINDLE

[75] Inventor: Norbert Hessbrüggen, Eschenbach, Fed. Rep. of Germany

[73] Assignee: EMAG Maschinenfabrik GmbH, Salach, Fed. Rep. of Germany

[21] Appl. No.: 388,141

[22] Filed: Jun. 14, 1982

[30] Foreign Application Priority Data

Jun. 15, 1981 [DE] Fed. Rep. of Germany ....... 3123639

[51] Int. Cl.³ ............................................. B23B 19/02
[52] U.S. Cl. ........................................ 82/28 R; 29/64
[58] Field of Search ................... 82/28 R, 2 R, 29 R; 279/4; 29/64

[56] References Cited

U.S. PATENT DOCUMENTS

| | | | |
|---|---|---|---|
| 980,614 | 1/1911 | DeLeeuw | 409/235 |
| 2,022,436 | 11/1935 | Schauer et al. | 10/136 R |
| 2,054,018 | 9/1936 | Gilchrist | 29/42 |
| 2,988,942 | 6/1960 | Garberding | 82/28 R |
| 3,785,227 | 1/1974 | Wolff | 82/28 R |

FOREIGN PATENT DOCUMENTS

| | | | |
|---|---|---|---|
| 639267 | 6/1950 | United Kingdom | 82/28 R |
| 604633 | 4/1978 | U.S.S.R. | 82/28 R |

Primary Examiner—Leonidas Vlachos
Attorney, Agent, or Firm—Peter K. Kontler

[57] ABSTRACT

A lathe whose hollow horizontal work spindle has a rear end portion extending from the headstock and carrying the chuck actuating mechanism. A discrete prime mover at the outside of the headstock transmits torque to the end portion of the work spindle through a separable transmission whose case is centered by a collar provided at the exterior of the headstock and surrounding the end portion of the work spindle. The transmission has an input element which receives torque from the prime mover, e.g., through a clutch or coupling, and a set of toothed members one of which is removably mounted on the end portion of the work spindle and another of which meshes with the one toothed member and is driven by the input element. The transmission can constitute a variable-ratio gear transmission, a constant-ratio gear transmission or a belt transmission wherein the second toothed member is an internally toothed belt.

9 Claims, 2 Drawing Figures

MACHINE TOOL WITH A SEPARABLE TRANSMISSION FOR ITS WORK SPINDLE

BACKGROUND OF THE INVENTION

The present invention relates to lathes and analogous machine tools in general, and more particularly to improvements in means for driving the work spindle or an analogous torque receiving member of a machine tool, especially the hollow horizontal work spindle which is mounted in the headstock of a lathe and whose rear end portion extends from the headstock and carries a chuck actuating mechanism. The chuck actuating mechanism has one or more portions extending through the hollow work spindle and operatively connected with a chuck or an analogous work- or tool-holding device at the front end of the work spindle.

It is already known to transmit torque to the rear end portion of the work spindle in a machine tool by resorting to a discrete prime mover which is remote from the work spindle and to a torque transmitting unit which includes a gear removably mounted on the work spindle and a power train connecting the gear with the output shaft of the prime mover. A torque transmitting unit which can be used to drive a gear at the rear end of a work spindle is disclosed, for example, in German publication entitled "Zeitschrift für wirtschaftliche Fertigung" (1969, Volume 2, pages 65 to 69, particularly FIG. 6). This publication discloses a separable torque transmitting unit so that, if necessary, it can be replaced with a different unit, for example, when the machine tool is to be used for a different purpose or if the decision regarding the use of a particular unit is postponed until shortly prior to final assembly or completion of the setup. A drawback of such machine tools is that the torque transmitting unit includes a wheel or gear on the exposed rear end portion of the work spindle, a gear transmission which is driven by the prime mover, as well as a belt transmission which is interposed between the gear or wheel and the gear transmission. The provision of a belt transmission necessarily limits the magnitude of torque which can be transmitted from the prime mover to the work spindle.

Another system for transmitting torque to the work spindle of a machine tool is disclosed in a German publication entitled "Werkstatt und Betrieb" (1976, Volume 2, pages 57 to 66). The gear transmission is a stationary unit which is installed next to the machine tool and transmits torque to the work spindle of the machine tool through the medium of a belt transmission. Thus, this prior construction shares the drawbacks of the construction which is described and shown in the first-mentioned German publication.

OBJECTS AND SUMMARY OF THE INVENTION

An object of the invention is to provide a machine tool wherein the means for transmitting torque to a work spindle or an analogous torque receiving member need not embody several transmissions one of which is a belt transmission.

Another object of the invention is to provide novel and improved separable or exchangeable means for driving the work spindle of a lathe or the like.

A further object of the invention is to provide a machine tool which can receive pronounced torque from a discrete prime mover, such as a variable-speed electric motor, in spite of the fact that the torque transmitting means can be separated from the torque receiving member.

Another object of the invention is to provide novel and improved means for driving the hollow work spindle of a lathe by any one of several discrete torque transmitting systems each of which is capable of transmitting a pronounced torque.

An additional object of the invention is to provide a novel and improved transmission for use in or with a machine tool of the above outlined character.

A further object of the invention is to provide the machine tool with a novel and improved housing which can be separably coupled with any one of a plurality of different torque transmitting systems.

Another object of the invention is to provide a transmission which can be readily attached to or detached from the housing of a machine tool and from the output element of a prime mover.

A further object of the invention is to provide a novel and improved method of transmitting torque from a prime mover to a remote or spaced-apart work spindle forming part of a lathe or another material removing machine tool.

The invention is embodied in a machine tool, particularly in a lathe, which comprises a housing (e.g., the headstock or tailstock of a lathe), a rotary torque receiving member which is installed in and has a portion extending from the housing (the torque receiving member can constitute a hollow horizontal work spindle whose exposed portion carries a chuck actuating mechanism), a variable-speed electric motor or another suitable prime mover, and a transmission including a case which is removably mounted on the housing, an input element which is mounted in the case and receives torque from the prime mover, e.g., through the medium of a clutch or coupling, a rotary first toothed member (such as a gear or a toothed pulley) which is preferably removably mounted on the exposed portion of the torque receiving member, and a second toothed member (such as a second gear or an internally toothed belt) which receives motion from the input element and meshes with the first toothed member.

The housing preferably comprises means for locating the transmission case in a predetermined position. Such locating means can comprise an external collar surrounding the exposed portion of the torque receiving member and an external projection or abutment which is spaced apart from the collar and against which the case abuts. The case has an opening which preferably snugly receives the collar. The collar and the abutment can be provided at a vertical outer side or surface of the housing. Means can be provided for removably holding the first toothed member on the exposed portion of the torque receiving member. The torque receiving member can be disposed at a level above the prime mover.

The novel features which are considered as characteristic of the invention are set forth in particular in the appended claims. The improved machine tool itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
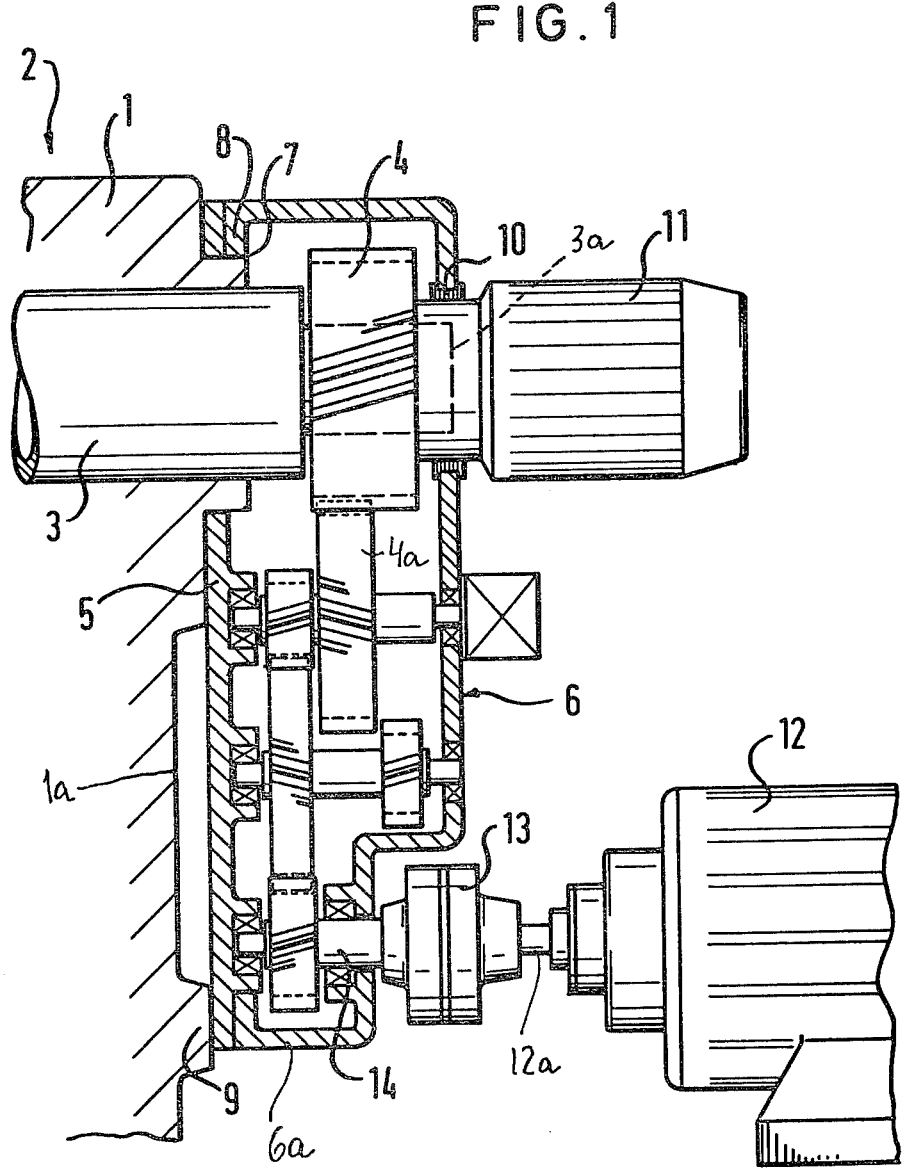
FIG. 1 is a fragmentary elevational view of a machine tool which embodies one form of the invention, the case of the transmission being shown in a vertical sectional view.

Referring first to FIG. 1, there is shown a portion of a machine tool 2 which can constitute a lathe having a headstock 1 forming part of or attached to a housing or frame and mounting a horizontal torque receiving member in the form of a hollow work spindle 3. The rear end portion 3a of the spindle 3 extends beyond the rear outer side 1a of the headstock 1 and carries a chuck actuating mechanism 11 of known design. Part or parts of such mechanism extend through the interior of the spindle 3 and serve to actuate the chuck (not shown) or an analogous work- or tool-engaging device at the front end of the spindle. The outer side 1a of the headstock 1 is formed with a centering or locating collar 7 which surrounds the rear end portion 3a of the work spindle 3, and with a locating abutment or projection 9 which is spaced apart from and is disposed at a level below the collar 7.

The work spindle 3 receives motion from a prime mover 12 (e.g., a variable-speed electric motor) which is mounted behind the outer side 1a of the headstock 1 and whose output shaft 12a is separably connected with the input element 14 of a gear transmission 6 by a coupling or clutch 13. The case 6a of the transmission 6 has an upright wall 5 with an opening 8 snugly receiving the collar 7 so as to ensure that the transmission 6 is properly located with reference to the headstock 1 and work spindle 3. The outer side of the wall 5 abuts against the projection 9. The case 6a of the transmission 6 further contains a first toothed member 4 which is a gear non-rotatably but removably secured to the rear end portion 3a of the work spindle, and at least one additional toothed member 4a (here shown as a gear) which mates with the gear 4 and receives torque from the input element 14. The power train in the case 6a of the illustrated transmission 6 comprises additional toothed members in the form of gears which transmit motion from the input element 14 to the gear 4a. The ratio of the transmission 6 can be constant or variable. The screws, bolts or analogous fasteners which separably secure the case 6a to the headstock 1 have been omitted in FIG. 1 for the sake of clarity. The reference character 10 denotes a sealing ring or retainer which centers the chuck actuating device 11 in the corresponding wall of the transmission case 6a and which can further serve as a retainer or as a part of a retainer for the gear 4 on the end portion 3a of the work spindle 3. The projection 9 is optional; it is desirable primarily when the bulk and/or weight of the transmission 6 is substantial so that the collar 7 and the adjacent portion of the wall 5 might not be able to maintain the transmission 6 in an optimum position with reference to the headstock 1 and prime mover 12. It will be noted that the chuck actuating mechanism 11 is accessible and capable of being manipulated when the transmission 6 is properly secured to the headstock 1, i.e., when the transmission can transmit torque from the output element 12a of the prime mover 12 to the work spindle 3.

It will further be noted that the transmission 6 is capable, by itself, of transmitting torque from the prime mover 12 to the work spindle 3, i.e., there is no need for such transmission plus a belt transmission which latter is deemed a necessary component or constituent in conventional machine tools. The transmission 6 can be removed with little loss in time for the purpose of inspection, repair or replacement with a different transmission, e.g., when the machine tool 2 is to be set up for the machining of a different series of workpieces whose treatment requires the transmission of lesser or greater torque. The last toothed member (4a) of the transmission 6 proper is in direct mesh with the toothed member (gear 4) which is removably mounted on the end portion 3a of and drives the work spindle 3. The centering and locating means 7 and 9 contribute to the possibility of eliminating an additional transmission, particularly a belt transmission, because they render it possible to install each of two or more different transmissions in an optimum position with reference to the work spindle 3 and output shaft 12a. As mentioned above, a belt transmission between the transmission 6 and the prime mover 12, or between the transmission 6 and the work spindle 3, would necessarily entail a reduction in the magnitude of maximum torque that can be transmitted to the work spindle.

The transmission 6 and the centering and locating means therefor are believed to constitute the first reliable and useful replaceable transmission system which can be used between a torque receiving member in a machine tool and a discrete prime mover without necessitating the provision of a belt transmission and while permitting convenient and rapid replacement of the transmission 6 with another transmission. This renders it possible to transmit to the torque receiving member (work spindle 3) substantial amounts of torque by a selected one of two or more different transmissions.

Figure 2:
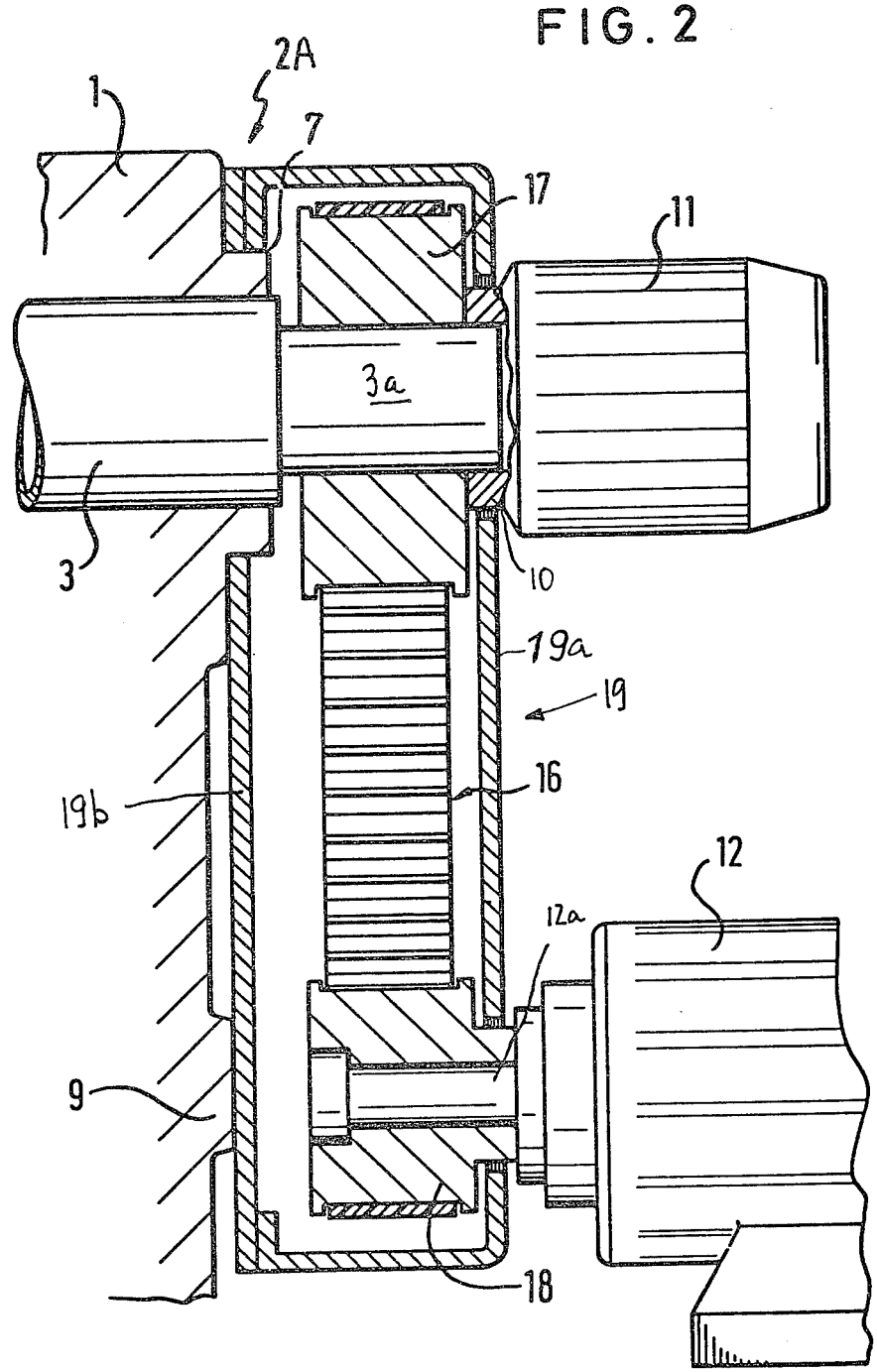
FIG. 2 is a similar view of a modified machine tool wherein the separable transmission has an internally toothed belt and toothed pulleys.

FIG. 2 shows a portion of a modified machine tool 2A wherein the headstock 1, hollow work spindle 3, its rear end portion 3a, the retainer 10 and the chuck actuating mechanism 11 are substantially identical with or analogous to the corresponding components of the machine tool 2 shown in FIG. 1. The output shaft 12a of the prime mover 12 shown in FIG. 2 drives the work spindle 3 through the medium of a modified transmission 19 which is a rather simple belt transmission having an externally toothed member (pulley) 17 removably mounted on the rear end portion 3a of the work spindle 3, an externally threaded toothed input element (pulley) 18 removably mounted on the output shaft 12a, and an internally threaded toothed member (endless flexible belt) 16 trained over the toothed pulleys 17 and 18. The manner in which the wall 19b of the transmission case 19a is located and centered by the collar 7 and projection 9 is the same as described in connection with FIG. 1. The screws, bolts or analogous fasteners which removably secure the case 19a to the headstock 1 are not shown in FIG. 2. The clutch or coupling 13 has been omitted because the output shaft 12a is readily detachable from the toothed input element 18 of the transmission 19. The case 19a not only constitutes a means for reducing the likelihood of injury to an attendant but also a means for damping noise which develops when the transmission 19 transmits torque from the prime mover 12 to the work spindle 3. Furthermore, the case 19a reduces the likelihood of contamination of toothed members and elements in the interior of the transmission 19.

As used in the appended claims, the term "transmission" is intended to embrace all types of variable-ratio or constant-ratio transmissions which can transmit torque through the medium of toothed members in the form of spur gears, herringbone gears, toothed pulleys, sprocket wheels and analogous components. While the transmission 6 of FIG. 1 is preferred at this time, especially for certain applications, the transmission 19 of FIG. 2 can be used with considerable advantage for many applications in lieu of conventional transmissions wherein a belt transmission and a further transmission are needed to establish a proper torque transmitting connection between a prime mover and the torque receiving member of a lathe or an analogous machine tool.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. In a machine tool, particularly in a lathe, the combination of a housing; a rotary torque receiving member installed in and having a portion extending from said housing; a prime mover; and a transmission including a case removably mounted on said housing, an input element mounted in said case and receiving torque from said prime mover, a rotary first toothed member removably mounted on said portion of said torque receiving member externally of said housing, and a second toothed member receiving motion from said input element and meshing with said first toothed member, said housing having means for locating said case in a predetermined position and said case having an opening which receives at least a portion of said locating means and has a diameter greater than said portion of said torque receiving member.

2. The combination of claim 1, wherein said toothed members are gears.

3. The combination of claim 1, wherein said first toothed member is a pulley and said second toothed member is an endless flexible element.

4. The combination of claim 1, further comprising retainer means for removably holding said first toothed member on said torque receiving member.

5. The combination of claim 1, wherein said housing includes a headstock and said torque receiving member includes a hollow work spindle.

6. The combination of claim 5, further comprising chuck actuating means provided on said portion of said spindle and disposed externally of said case.

7. The combination of claim 1, wherein said locating means includes an external collar provided on said housing and surrounding said portion of said torque receiving member, said opening snugly receiving said collar to thereby locate said case in said predetermined position with reference to said housing.

8. The combination of claim 7, wherein said housing further comprises an external abutment for said case, said abutment being spaced apart from said collar.

9. The combination of claim 1, wherein said torque receiving member is a hollow spindle disposed at a level above said prime mover, said housing having a substantially vertical outer side adjacent to said case and further comprising coupling means between said prime mover and said input element.

* * * * *